UNITED STATES PATENT OFFICE.

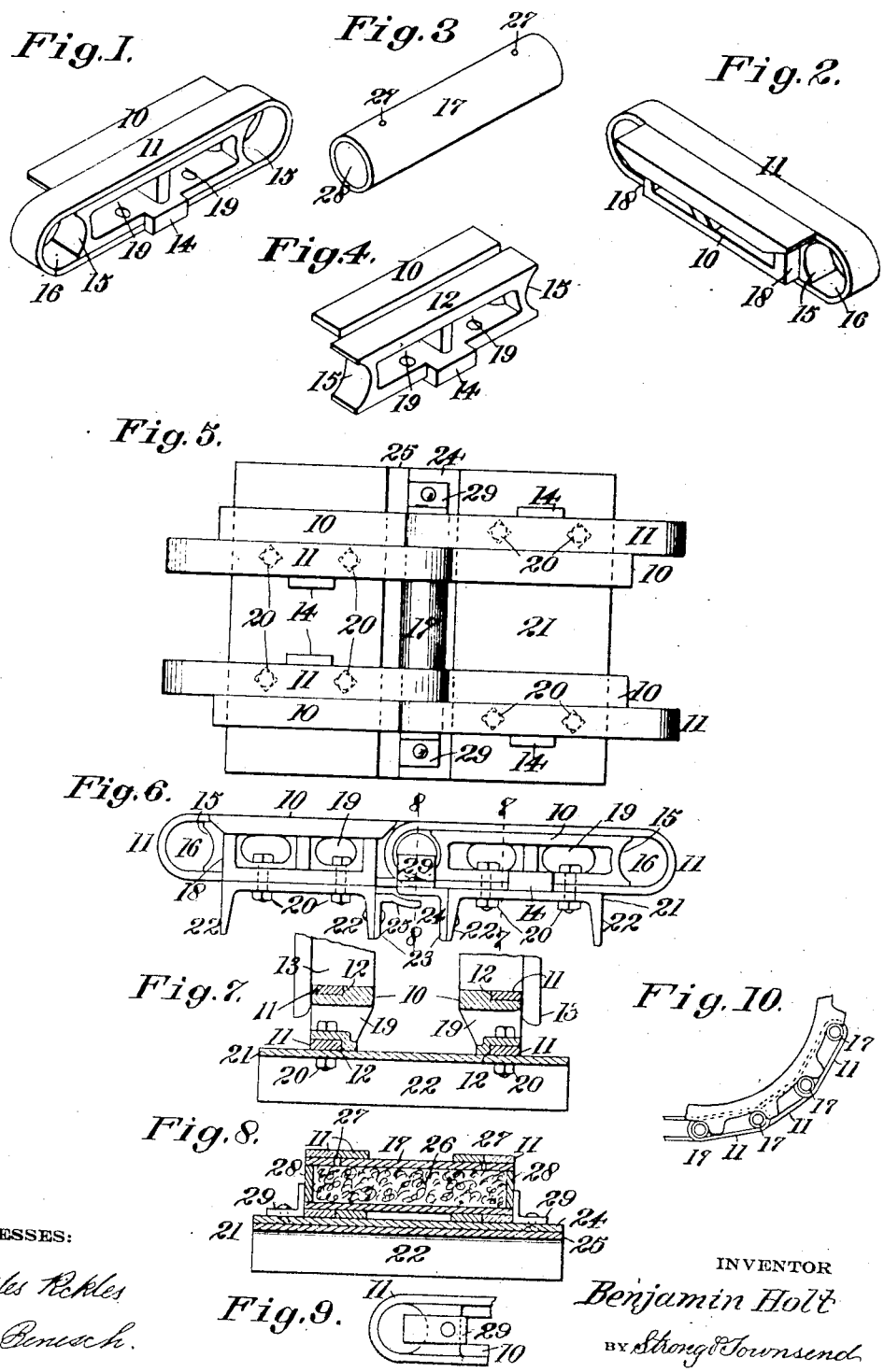

BENJAMIN HOLT, OF STOCKTON, CALIFORNIA.

TRACK-CHAIN.

1,258,618.

Specification of Letters Patent.     Patented Mar. 5, 1918.

Application filed September 5, 1917. Serial No. 189,738.

*To all whom it may concern:*

Be it known that I, BENJAMIN HOLT, a citizen of the United States, residing at Stockton, in the county of San Joaquin and State of California, have invented new and useful Improvements in Track-Chains, of which the following is a specification.

This invention relates to track chains for tractors of the endless, self-laying track type.

My object is to reduce wear on the sprocket teeth on both the chain track and the driving wheel, and to otherwise simplify and improve the construction and operation of the chain track.

This I accomplish by the employment of a coupling pin for adjacent links, which pin is rotatable in its bearings and constitutes also a sprocket tooth for the chain to coöperate with the sprocket teeth of the driving wheel. By reason of its rotatability it will roll whenever engaging with a tooth of the sprocket wheel and thus friction will be reduced both on the wheel and chain and the wear on the pin will be more generally distributed. In this connection I provide novel means for oiling the bearings of the rotating pin, preferring to make the pin tubular and fill it with the oil soaked packing, from which oil escapes through suitable apertures to the bearings.

Other distinguishing features of the present track chain include the utilization of a maximum of parts made of stock materials, whereby a great saving in the cost of manufacture is effected.

In the accompanying drawings:

Figures 1 and 2 show perspective views of one of the side pieces employed in each of the links of the track chain.

Fig. 3 shows a perspective view of one of the coupling pins.

Fig. 4 shows a perspective view of a side piece with the surrounding band removed.

Fig. 5 shows a plan view of two of the connected links.

Fig. 6 shows a side elevation of the same.

Fig. 7 shows a sectional view, taken on the line 7—7 of Fig. 6.

Fig. 8 shows a sectional view, taken on the line 8—8 of Fig. 6 and further discloses fragmentary portions of truck rollers as resting upon the side pieces of the track.

Fig. 9 shows a detail of a slight modification of the invention.

Fig. 10 shows a diagrammatic view of a portion of the chain track in engagement with the sprocket driving wheel of a tractor.

The track chain comprises a series of articulated link sections, each made up of a pair of spaced cast iron side pieces 10, surrounding each of which is a wrought iron band 11 of less width and seated in depressions 12 at the top and bottom of the side piece and flush with the laterally extending surfaces thereof. The side pieces are made wide, the inner longitudinal face especially being about twice the width of the surrounding band, whereby to form a widened track to receive truck rollers 13. The terminals of the band 11, preferably, do not come together, being held spaced by a ledge 14 on the cast iron piece. Each band is formed with rounded ends which, in conjunction with the concaved ends 15 of the side piece, form circular openings 16 which receive tubular pins 17 for connecting adjacent links together, said pins also forming teeth to engage with sprocket teeth on the driving wheel A of the tractor, as shown in Fig. 10.

This combined coupling pin and chain tooth, unlike others, has no gudgeon block or housing and is rotatable within its bearings in the side pieces. Therefore, when engaging a tooth of the sprocket driving wheel it will be caused to roll and thereby the usual friction occurring between the teeth of the track chain and wheel will be eliminated and also wear on the teeth of the track chain will be evenly distributed.

Alternate links have the side pieces spaced so that the projecting ends of the bands embrace the projecting ends of the bands or intermediate links, this being accomplished by disposing the side pieces in one instance so that the bands are on the outside and in the other instance are on the inside, as shown in Fig. 5. Hence the same parts enter into the construction of all links. The external curved ends of the bands abut the laterally extending portions of the side pieces, the latter being recessed, as shown at 18, to accommodate them.

Each side piece is preferably dished out at its central body portion and provided with perforations or openings 19 to save weight and material and also to permit mud and dirt to be expelled by the sprocket teeth on the driving wheel of the tractor.

The bands 11 are held in place on the side pieces by bolts 20 which pass through the bottom web of each side piece and preferably act also to secure a grouser or shoe 21 in place on the link. The shoe of each link is in the form of a channel bar extending transversely of the side pieces and of less width than the length of said side pieces. The side webs 22 of the channel bar are disposed outwardly to form ground-engaging members. For the purpose of keeping mud and dirt from entering the interior of the links, especially at the joints, and also for supporting the links at these points, each web 22 receives an angle bar 23, bolted or riveted thereto and arranged with their flanges projecting beneath the side pieces and overlapping one another. The innermost flange 24 engages closely against the bottom of the side pieces and forms a support for the overlying ends of the links, whereas the outermost flange 25 is preferably curved to permit the links to flex at their joints in passing around the sprocket and carrying wheels of the tractor in operation.

The tubular pin 17 is made self-oiling by reason of a packing 26 filling its interior and which is adapted to be saturated with oil. Through perforations 27 in those portions of the pin which lie within the openings 16 the oil escapes to lubricate the bearing surfaces. The ends of the pin are closed, preferably, by means of removable disks 28, and the pins are held in place by clips 29, which latter may either be secured to the flange 24 of the angle bar 23, as shown in Figs. 6 and 8, or to the side pieces, as shown in Fig. 9.

Throughout the construction of this track chain I have utilized to the greatest extent stock materials, such, for instance, as the tubular pins 17, the bands 11, the channel bars 21, and the angle bars 23. In fact, the only specially fabricated part is the side piece 10. The resulting track is of a strong and durable nature, the wrought iron bands 11 affording a wearing surface for the coupling pins 17 which is superior to that offered by cast iron parts. The joints are self-oiling and the parts being detachable throughout are easily and cheaply replaced when worn.

The pins 17 are of uniform diameter throughout their length and being held in place by detachable means can easily be removed from their bearings at either side of the track. The ends of the tubular pins being also removable make it a comparatively simple matter to gain access to the packing material within.

Having thus described my invention, what I claim and desire to secure by Letters Patent is—

1. In a tractor of the endless, self-laying track type, the combination with a sprocket driving wheel of a track chain made up of a series of articulated link sections, each section comprising spaced side pieces, those of adjacent links being overlapped at their ends, and a coupling pin extending through apertures in said overlapping ends and rotatable within for connecting adjacent links together and also forming a sprocket tooth for the track chain to coöperate with the teeth on the driving sprocket wheel, the said pin, when engaging the teeth of the wheel, being free to roll, whereby friction is eliminated and the wear thereon is evenly distributed.

2. In a tractor of the endless, self-laying track type, the combination with a sprocket driving wheel of a track chain made up of a series of articulated link sections, each section comprising spaced side pieces, those of adjacent links being overlapped at their ends, a coupling pin extending through apertures in said overlapping ends and rotatable within for connecting adjacent links together and also forming a sprocket tooth for the track chain to coöperate with the teeth on the driving sprocket wheel, the said pin, when engaging the teeth of the wheel, being free to roll, whereby friction is eliminated and the wear thereon is evenly distributed, said pin being of uniform diameter throughout its length, and detachable means for holding it in place within the side pieces.

3. In a tractor of the endless, self-laying track type, the combination with a sprocket driving wheel of a track chain made up of a series of articulated link sections, each section comprising spaced side pieces, those of adjacent links being overlapped at their ends, a coupling pin extending through apertures in said overlapping ends and rotatable within for connecting adjacent links together and also forming a sprocket tooth for the track chain to coöperate with the teeth on the driving sprocket wheel, the said pin, when engaging the teeth of the wheel, being free to roll, whereby friction is eliminated and the wear thereon is evenly distributed, said pin being made tubular, and a packing saturated with oil received within and lubricating the bearings through apertures in the walls of said pin.

4. In a tractor of the endless, self-laying track type, the combination with a sprocket driving wheel, of a track chain made up of a series of articulated link sections, each section comprising spaced side pieces, those of adjacent links being overlapped at their ends, a coupling pin extending through apertures in said overlapping ends and rotatable within for connecting adjacent links together and also forming a sprocket tooth for the track chain to coöperate with the teeth on the driving sprocket wheel, the said pin, when engaging the teeth of the wheel, being free to roll, whereby friction is eliminated and the wear thereon is evenly distributed, said pin being made tubular, a packing saturated with oil received within and lubricating the bearings through apertures in the walls of said pin, and removable disks for closing the ends of said tubular pin.

5. A track chain made up of a series of articulated link sections, each comprising spaced side pieces arranged to overlap at their connected ends, and a cylindrical pin passing through the opening in the overlapping ends of the side pieces for coupling the parts together and forming also a pin tooth to engage with a sprocket driving wheel.

6. A track chain made up of a series of articulated link sections, each comprising spaced side pieces arranged to overlap at their connected ends, a cylindrical pin passing through openings in the overlapping ends of the side pieces for coupling the parts together and forming also a pin tooth to engage with a sprocket driving wheel, said pin being rotatable within said opening, and means for oiling the bearing surface between said pin and side pieces.

7. A track chain made up of a series of articulated link sections, each comprising spaced side pieces arranged to overlap at their connected ends, a tubular pin passing through openings in the overlapping ends of the side pieces for connecting them together, and a packing material within said pin saturated with oil, said pin having its walls perforated at the portions lying within the openings to permit the escape of oil from within, whereby to lubricate the bearing surface between the pin and side pieces.

8. A track chain made up of a series of articulated link sections, each link comprising spaced side pieces of cast iron, and a band of wrought iron surrounding each side piece and secured thereto.

9. A track chain made up of a series of articulated link sections, each link comprising spaced side pieces of cast iron, and a band of wrought iron surrounding each side piece and secured thereto, said wrought iron bands forming a portion of the wearing surface of the track and having curved ends spaced from the ends of the side pieces and forming in conjunction therewith apertures to receive coupling pins, whereby adjacent links are connected together.

10. A track chain made up of a series of articulated link sections, each formed of spaced side pieces, and bands surrounding the same and secured thereto, the bands at their ends forming in conjunction with the ends of the side pieces apertures to receive coupling pins for connecting adjacent links together.

11. A track chain made up of a series of articulated link sections, each formed of spaced side pieces, and bands surrounding the same and secured thereto, the bands at their ends forming in conjunction with the ends of the side pieces apertures to receive coupling pins for connecting adjacent links together, the bands of alternate links being arranged so as to receive between them the bands of intermediate links at their connected ends.

12. A track chain made up of a series of articulated link sections, each formed of spaced side pieces, and bands surrounding the same and secured thereto, the bands at their ends forming in conjunction with the ends of the side pieces apertures to receive coupling pins for connecting adjacent links together, the bands of alternate links being arranged so as to receive between them the bands of intermediate links at their connected ends, said bands being of less width than the side pieces and the latter projecting at one side flush with the surface of the bands to form widened tracks.

13. A track chain made up of a series of articulated link sections, each formed of spaced side pieces, and bands surrounding the same and secured thereto, the bands at their ends forming in conjunction with the ends of the side pieces apertures to receive coupling pins for connecting adjacent links together, the bands of alternate links being arranged so as to receive between them the bands of intermediate links at their connected ends, said bands being of less width than the side pieces and the latter projecting at one side flush with the surface of the bands to form widened tracks, the exterior of the curved ends of the bands abutting the laterally projecting ends of the side pieces.

14. A track chain made up of a series of articulated link sections, each formed of spaced side pieces, and bands surrounding the same and secured thereto, the bands at their ends forming in conjunction with the ends of the side pieces apertures to receive coupling pins for connecting adjacent links together, the bands of alternate links being arranged so as to receive between them the bands of intermediate links at their connected ends, said bands being of less width than the side pieces and the latter projecting at one side flush with the surface of the bands to form widened tracks, said side pieces being dished and perforated at their central body portions.

15. A track chain made up of a series of articulated link sections, each formed of spaced side pieces, and bands surrounding the same and secured thereto, the bands at their ends forming in conjunction with the ends of the side pieces apertures to receive coupling pins for connecting adjacent links together, said bands being secured in place by bolts passing therethrough and entering the outer longitudinal faces of the side pieces.

16. A track chain made up of a series of articulated link sections, each formed of spaced side pieces, bands surrounding the same and secured thereto, the bands at their ends forming in conjunction with the ends of the side pieces apertures to receive coupling pins for connecting adjacent links together, said bands being secured in place by bolts passing therethrough and entering the outer longitudinal faces of the side pieces, and a grouser for each link also held in place by said bolts.

17. A track chain made up of a series of articulated link sections, each comprising spaced side pieces, and a shoe in the form of a channel bar extending transversely of the side pieces, the side webs of the channel bar being directed outwardly to form ground-engaging members.

18. A track chain made up of a series of articulated link sections, each comprising spaced side pieces, a shoe in the form of a channel bar extending transversely of the side pieces, the side webs of the channel bar being directed outwardly to form ground-engaging members, said channel bar being of less width than the length of the side faces, and means carried on the exterior faces of the side webs of the angle bars and projecting beneath the connected ends of the side pieces to support the latter and exclude dust and dirt.

19. A track chain made up of a series of articulated link sections, each comprising spaced side pieces, a shoe in the form of a channel bar extending transversely of the side pieces, the side webs of the channel bar being directed outwardly to form ground-engaging members, said channel bar being of less width than the length of the side faces, and means carried on the exterior faces of the side webs of the angle bars and projecting beneath the connected ends of the side pieces to support the latter and exclude dust and dirt, said last mentioned pieces being in the form of angle bars having their flanges overlapping.

20. A track chain made up of a series of articulated link sections, each comprising spaced side pieces of cast metal, a band of wrought iron surrounding each side piece with curved ends spaced from the ends of the side pieces to form apertures to receive a coupling pin, and a shoe formed of channel bar carried upon the side pieces, the side webs of the channel bar extending outwardly to form ground-engaging members, and bolts projecting through the side pieces, bands and angle bar for securing the parts together.

21. A track chain made up of a series of articulated link sections, each comprising spaced side pieces of cast metal, a band of wrought iron surrounding each side piece with curved ends spaced from the ends of the side pieces to form apertures to receive a coupling pin, a shoe formed of channel bar carried upon the side pieces, the side webs of the channel bar extending outwardly to form ground-engaging members, bolts projecting through the side pieces, bands and angle bar for securing the parts together, a coupling pin for connecting adjacent links together, said coupling pin being in the form of a tubular member projecting through the apertures in the side pieces, and a packing material within the tubular member saturated with oil and arranged to discharge oil onto the bearing surfaces between the pin and side pieces.

In testimony whereof I have hereunto set my hand in the presence of two subscribing witnesses.

BENJAMIN HOLT.

Witnesses:
R. E. MANN,
O. H. ECCLESTON.